United States Patent [19]
Chiu

[11] Patent Number: 6,036,536
[45] Date of Patent: Mar. 14, 2000

[54] DIFFERENT FEATURES IN THE STRUCTURE OF AN ELECTRICAL OUTLET

[76] Inventor: Jin-Hsien Chiu, P.O. Box 82-144, Taipei, Taiwan

[21] Appl. No.: 09/224,893

[22] Filed: Dec. 31, 1998

[51] Int. Cl.[7] .................................................. H01R 13/60
[52] U.S. Cl. ............................ 439/536; 439/148; 174/66
[58] Field of Search .................................... 439/536, 105; 174/59, 66, 67, 55; 220/241, 242; D13/156; D8/353

[56] References Cited

U.S. PATENT DOCUMENTS

| | | | |
|---|---|---|---|
| 5,524,330 | 6/1996 | Alberini | 174/66 |
| 5,832,641 | 11/1998 | Osterbrock et al. | 174/66 |
| 5,955,701 | 9/1999 | Schockner | 439/536 |

FOREIGN PATENT DOCUMENTS 47903  3/1979  Japan ..................................... 439/651

*Primary Examiner*—Steven L. Stephan
*Assistant Examiner*—J. F. Duverne
*Attorney, Agent, or Firm*—A & J

[57] ABSTRACT

An electrical outlet includes a switch plate having an outer side formed with a raised portion and an inner side formed with a socket body, the socket body being provided with three conducting members and a plastic protective cover, three wire self-locking devices including two bidirectional metal fixing members and a plastic cap, a fuse device, a current indicator mounted on the switch plate, a safety cover pivotally installed on the raised portion and provided with two hooks, whereby the outlet is safe in use and can be rapidly and easily assembled.

1 Claim, 10 Drawing Sheets

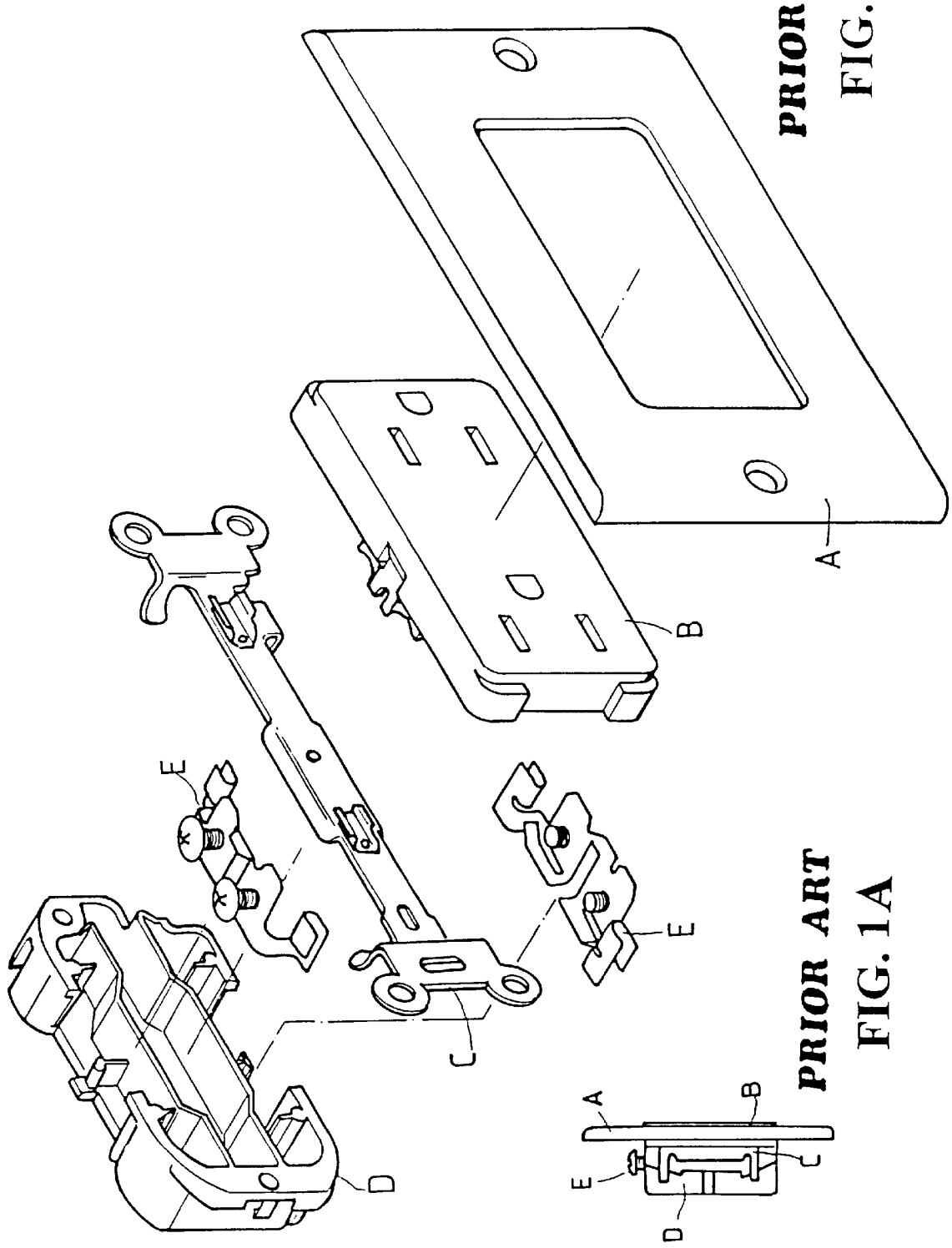

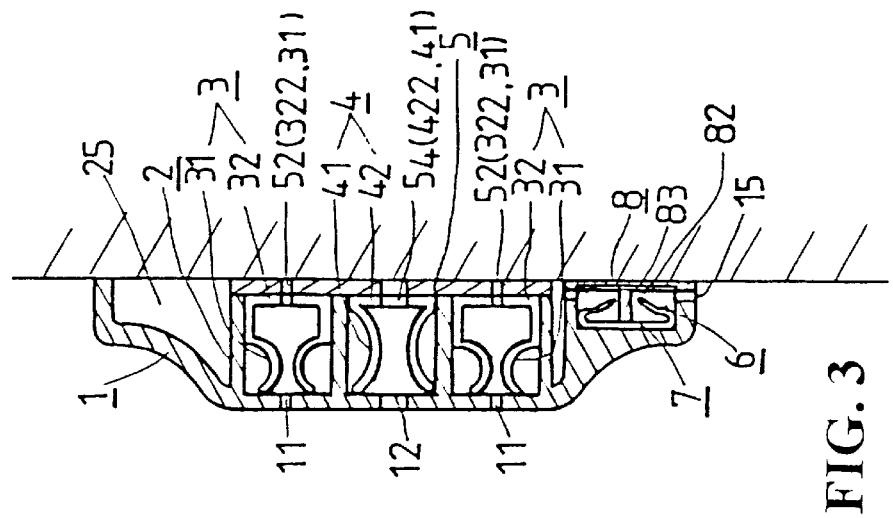
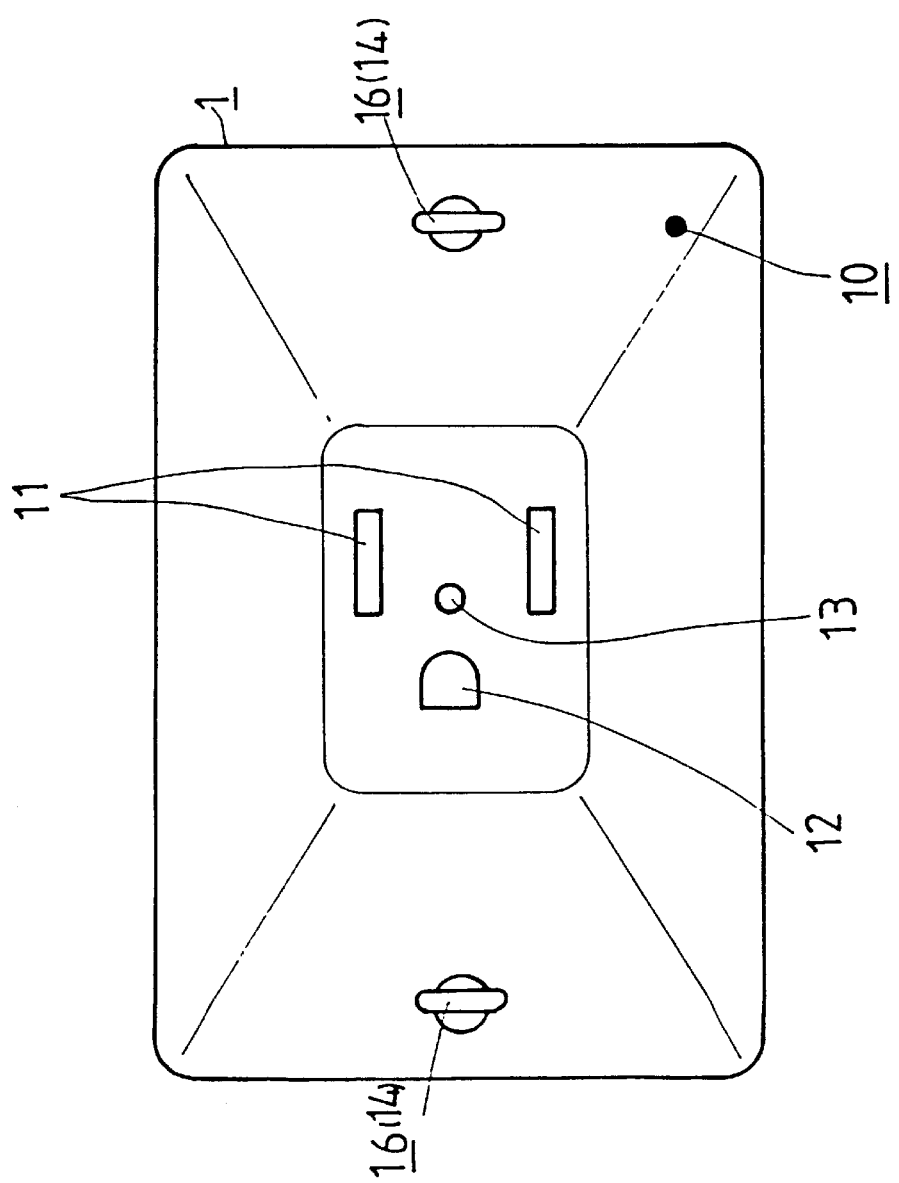
FIG. 3
FIG. 2

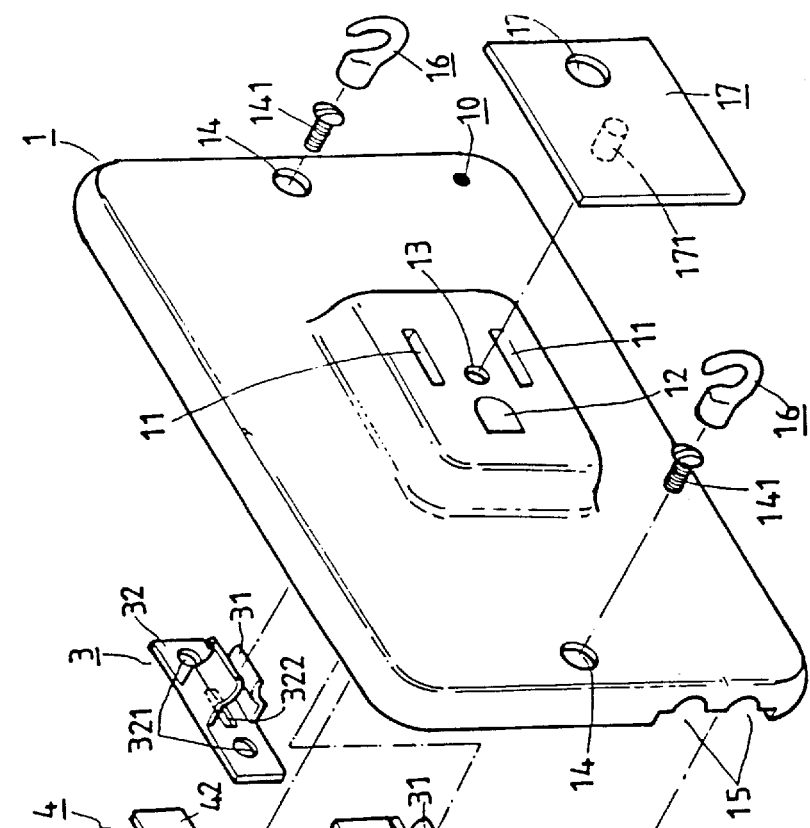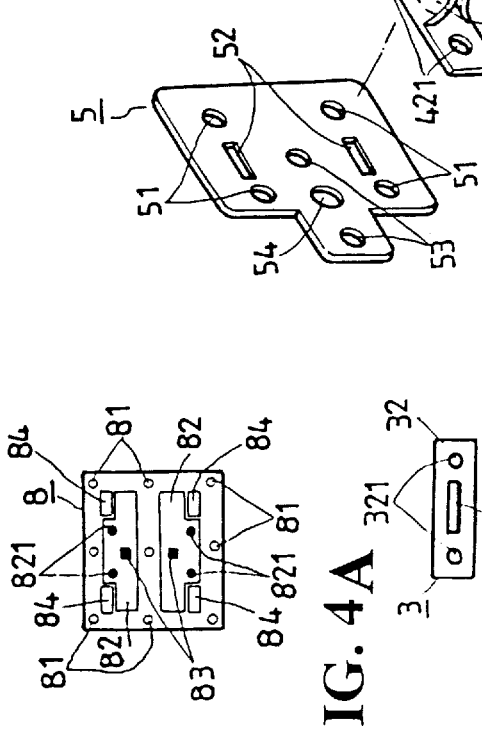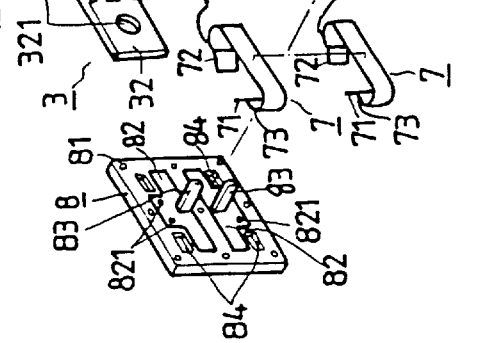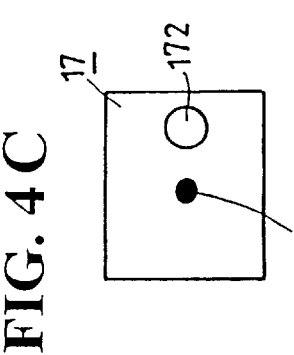
FIG. 4
FIG. 4A
FIG. 4B
FIG. 4C
FIG. 4D

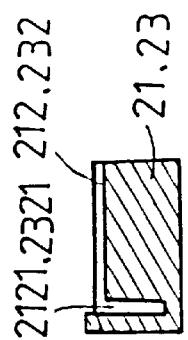
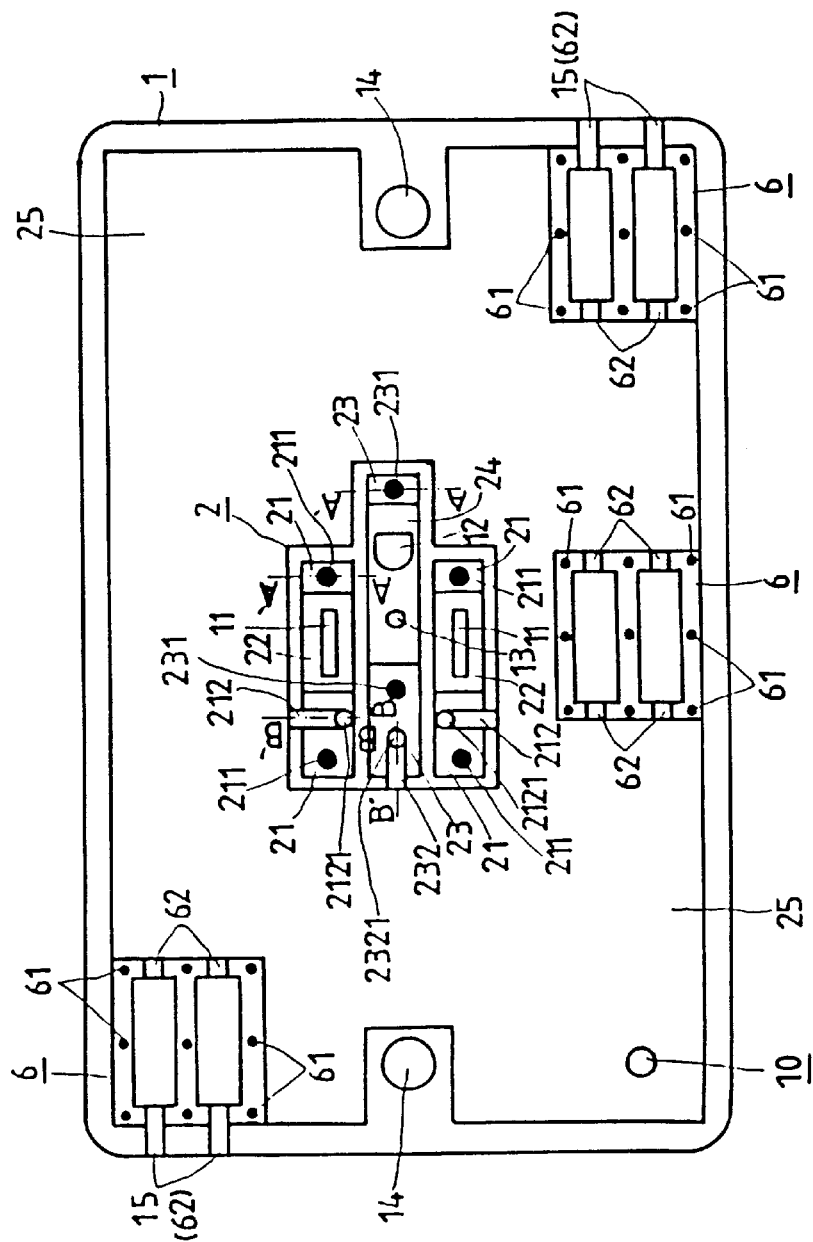
FIG. 5

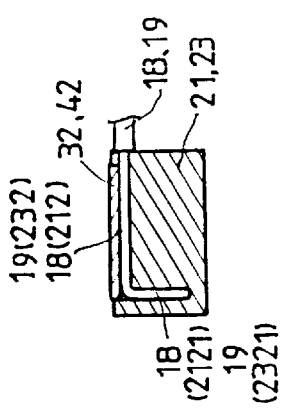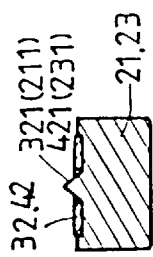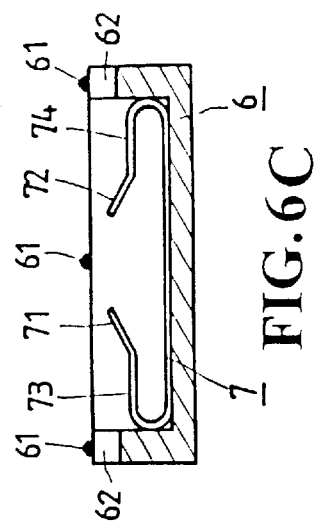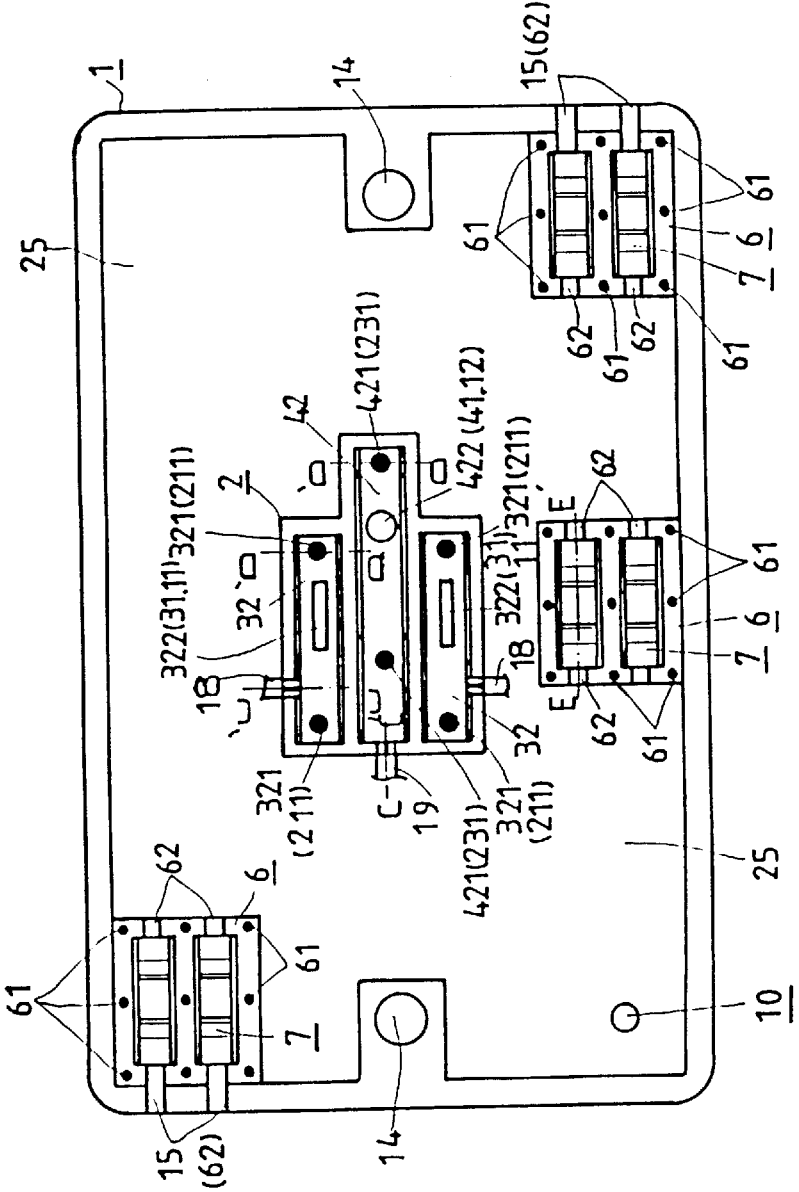

DIFFERENT FEATURES IN THE STRUCTURE OF AN ELECTRICAL OUTLET

BACKGROUND OF THE INVENTION

1. Field of the Invention

This invention is related to an improvement in the structure of an electrical outlet.

2. Description of the Prior Art

Referring to FIGS. 1 and 1A, the conventional electrical outlet generally comprises a switch plate A, a socket B, a combined fixing metal plate and grounding member C, a housing D, and a pair of conductive members E. Nevertheless, such an electrical outlet is difficult to assemble and high in cost thereby making it unfit for practical use.

Therefore, it is an object of the present invention to provide an improvement in the structure of an electrical outlet which can obviate and mitigate the above-mentioned drawbacks.

SUMMARY OF THE INVENTION

This invention is related to an improvement in the structure of an electrical outlet.

According to a preferred embodiment of the present invention, an electrical outlet includes a switch plate having an outer side formed with a raised portion and an inner side formed with a socket body, the socket body being provided with three conducting members and a plastic protective cover, three wire self-locking devices including two bidirectional metal fixing members and a plastic cap, a fuse device, a current indicator mounted on the switch plate, a safety cover pivotally installed on the raised portion and provided with two hooks.

It is the primary object of the present invention to provide an improved electrical outlet which is safe in use.

It is another object of the present invention to provide an improved electrical outlet which can be rapidly assembled.

It is still another object of the present invention to provide an improved electrical outlet which is easy to manufacture.

It is still another object of the present invention to provide an improved electrical outlet which is durable in structure.

It is a further object of the present invention to provide an improved electrical outlet which is fit for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

These and other features of the present invention and the attendant advantages will be readily apparent to those having ordinary skill in art and the invention will be more easily understood from the following detailed description of the preferred embodiment of the present invention taken in conjunction with the accompanying drawings wherein like reference characters represent like parts throughout the views, and wherein:

FIG. 1 is an exploded view of a prior art electrical outlet;

FIG. 2 is a side view of the prior art electrical outlet;

FIG. 3 is a front view of the present invention;

FIG. 4 is an exploded view of the present invention;

FIG. 4A is a plan view of the plastic cap;

FIG. 4B is a plan view of the conducting member for power transmission;

FIG. 4C is a plan view of the conducting member for grounding purpose;

FIG. 4D is a front view of the safety cover;

FIG. 5 is a rear view of the present invention;

FIG. 5A is a sectional view taken along line A–A' of FIG. 5;

FIG. 5B is a sectional view taken along line B–B' of FIG. 5;

FIG. 6 is a rear view of the present invention, with the wires, the conducting members and the bidirectional metal fixing members arranged in place;

FIG. 6A is a sectional view taken along line C–C' of FIG. 6;

FIG. 6B is a sectional view taken along line D–D' of FIG. 6;

FIG. 6C is a sectional view taken along line E–E' of FIG. 6;

DETAILED DESCRIPTION OF THE PREFERRED EMBODIMENT

Figure 7A:
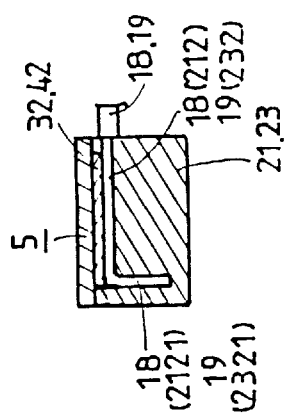
FIG. 7A is a sectional view taken along line F–F' of FIG. 7.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 7B:
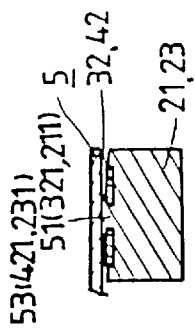
FIG. 7B is a sectional view taken along line G–G' of FIG. 7.
Figure 7C:
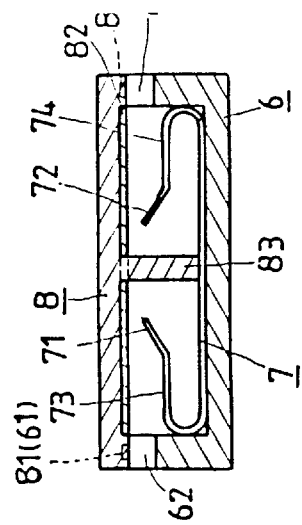
FIG. 7C is a sectional view taken along line H–H' of FIG. 7.
Figure 7:
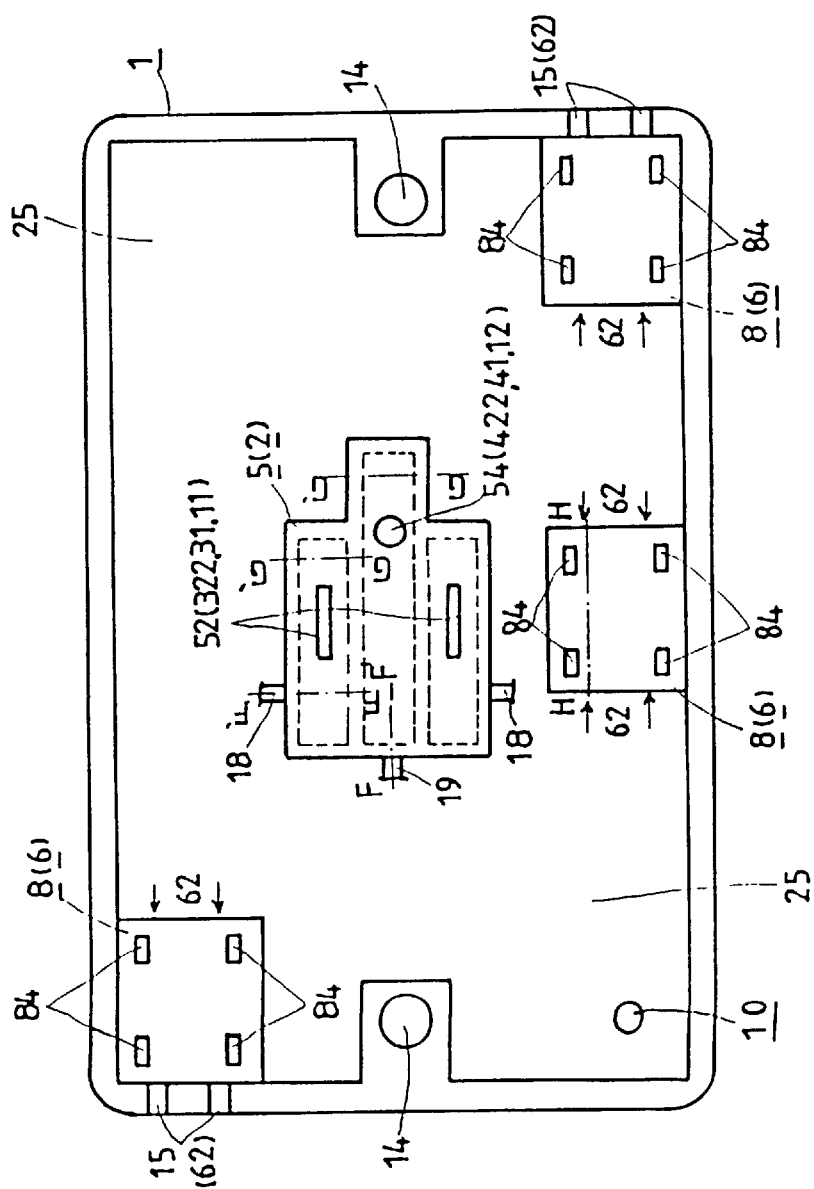
FIG. 7 illustrates the installation of the plastic protective cover on the socket body and the plastic cap on the wire self-locking device.
Figure 8A:
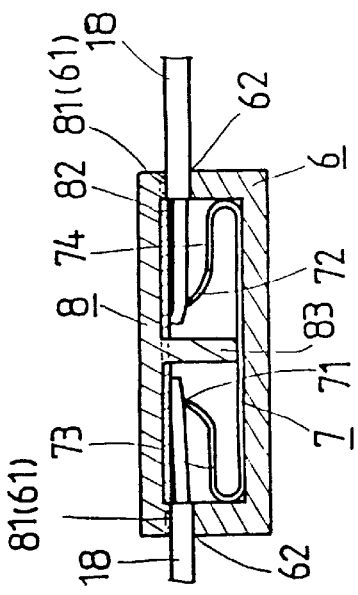
FIG. 8A is a sectional view illustrating how the wire is fixed by the wire self-locking device.
Figure 8B:
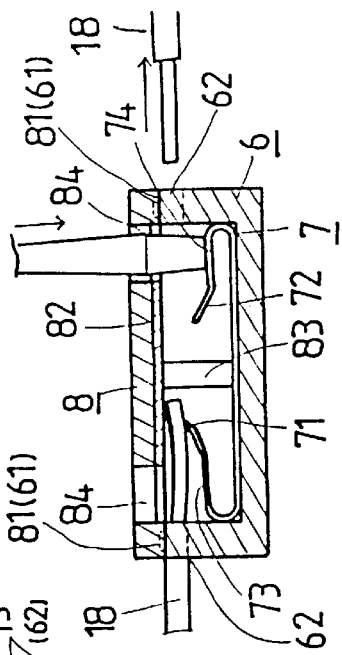
FIG. 8B is a sectional view illustrating how to release the wire from the wire self-locking device.
Figure 8:
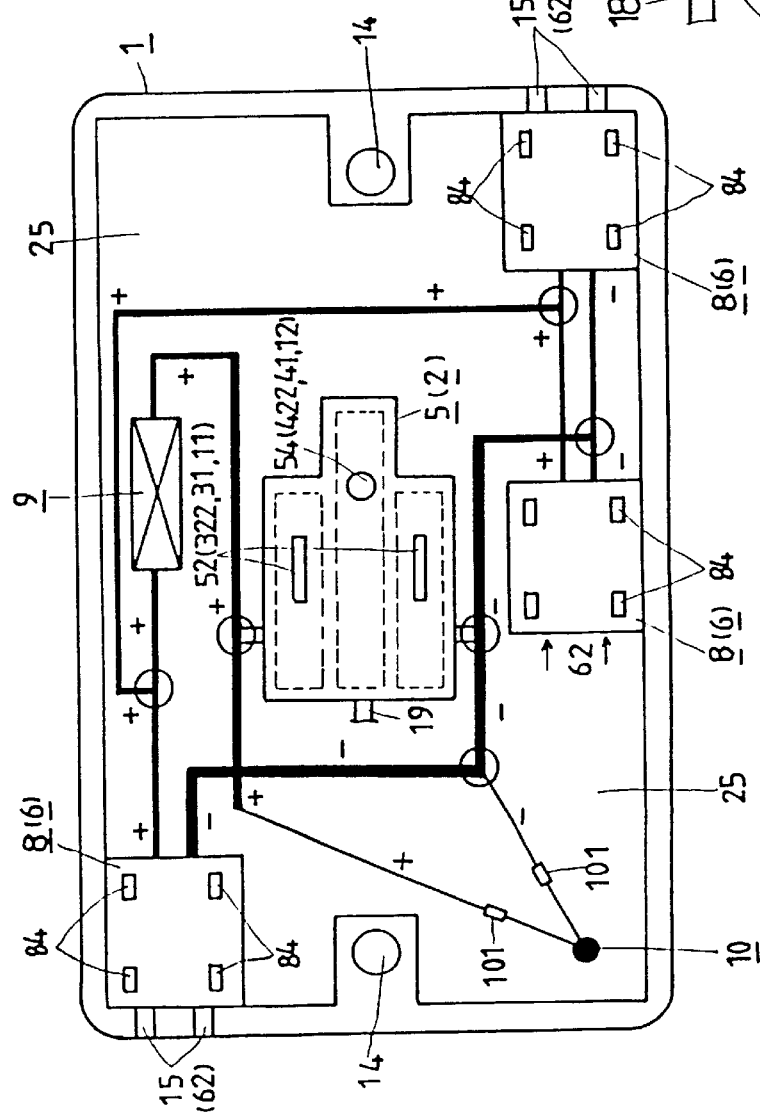
FIG. 8 illustrates the installation of the fuse device, the current indicator and the wire self-locking device.
Figure 10:
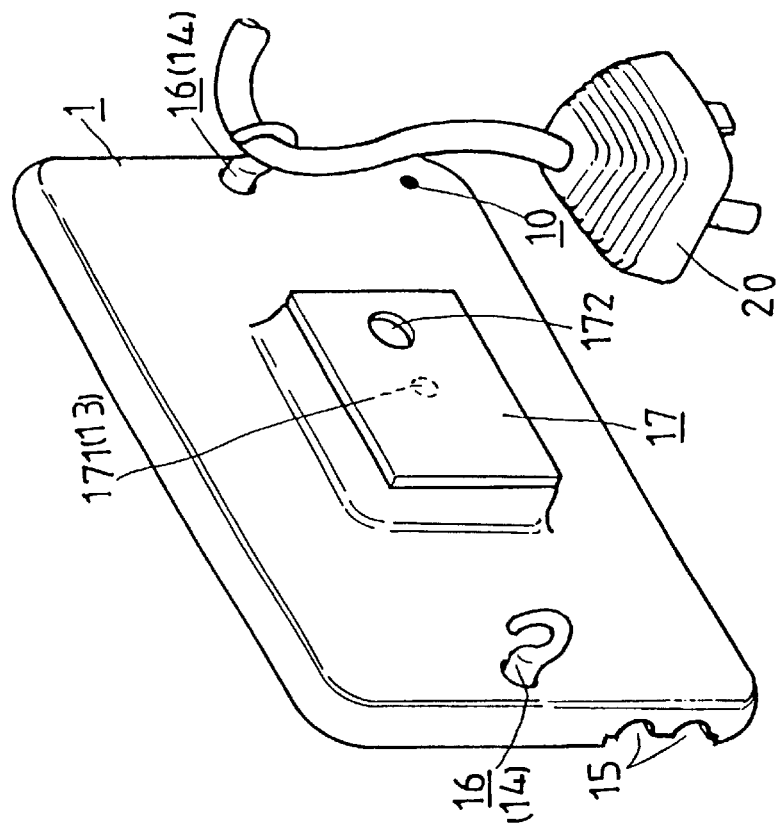
FIG. 10 illustrates how to close the outlet with the safety cover.
Figure 9:
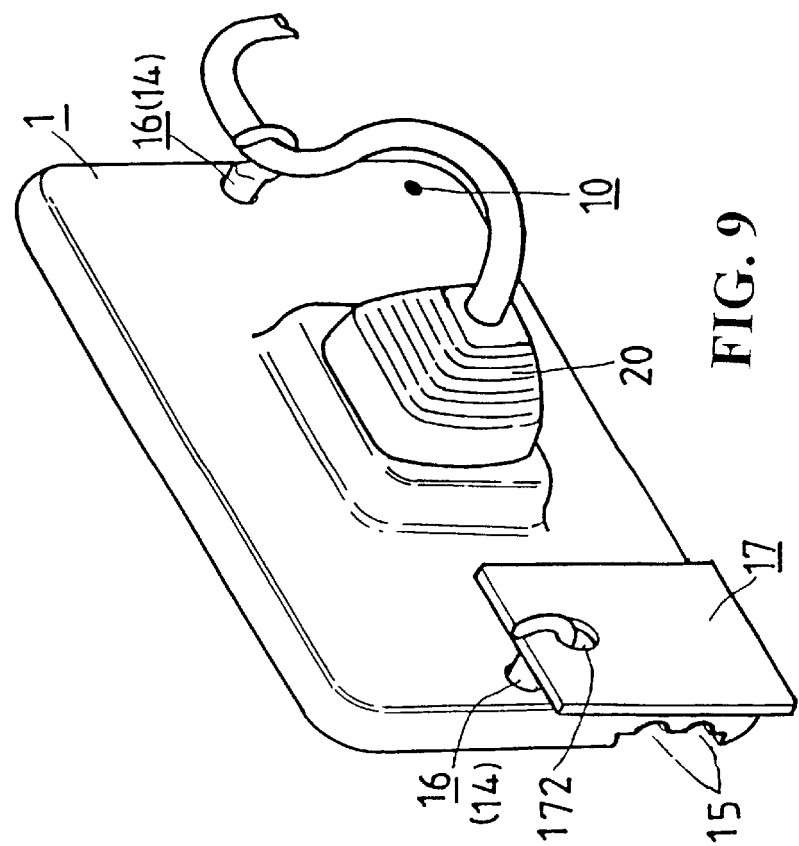
FIG. 9 illustrates how to use the hooks to suspend the wire and the safety cover.
Figure 11:
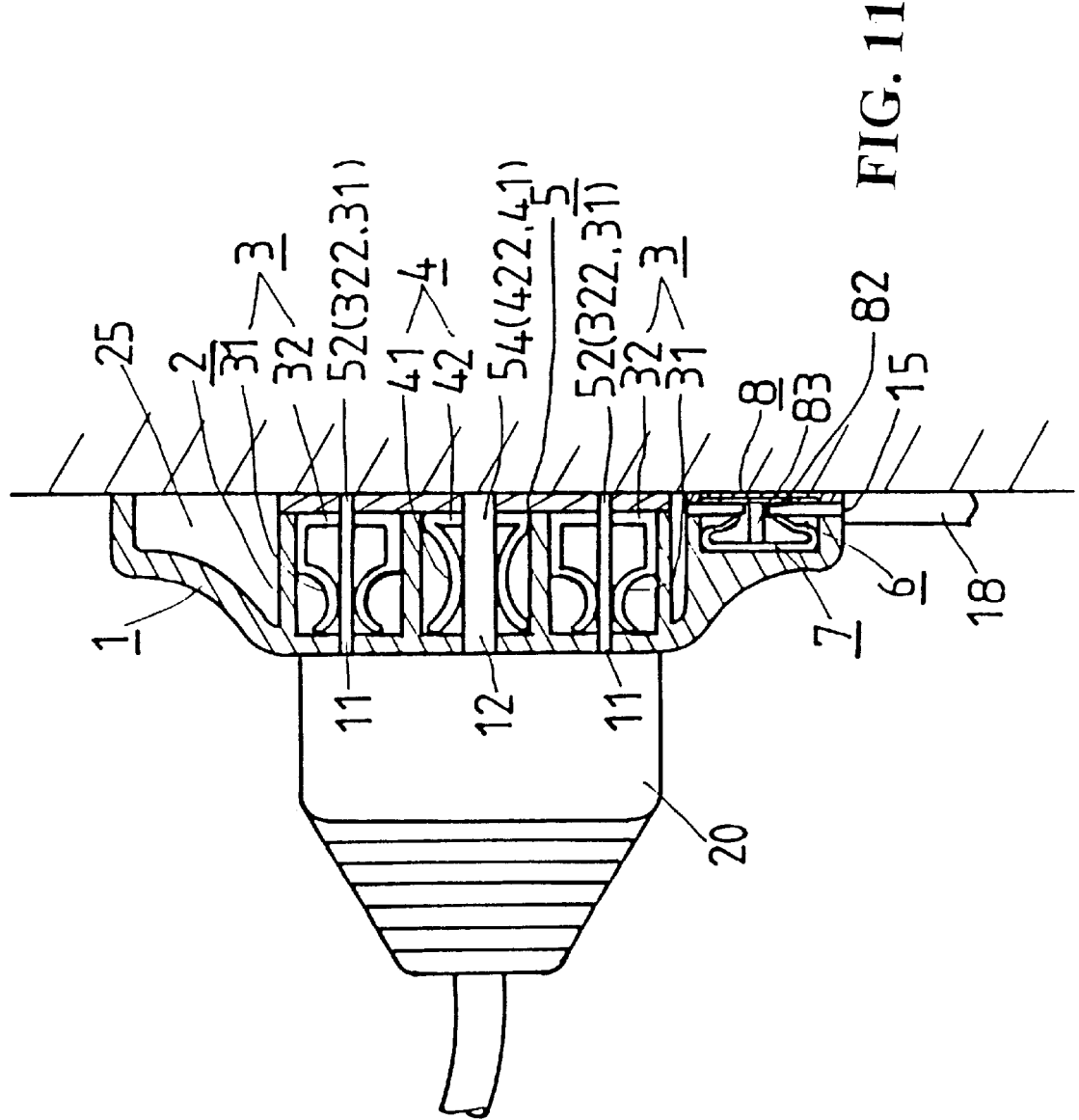
FIG. 11 is a sectional view illustrating the engagement between the plug and the outlet according to the present invention.
Figure 12:
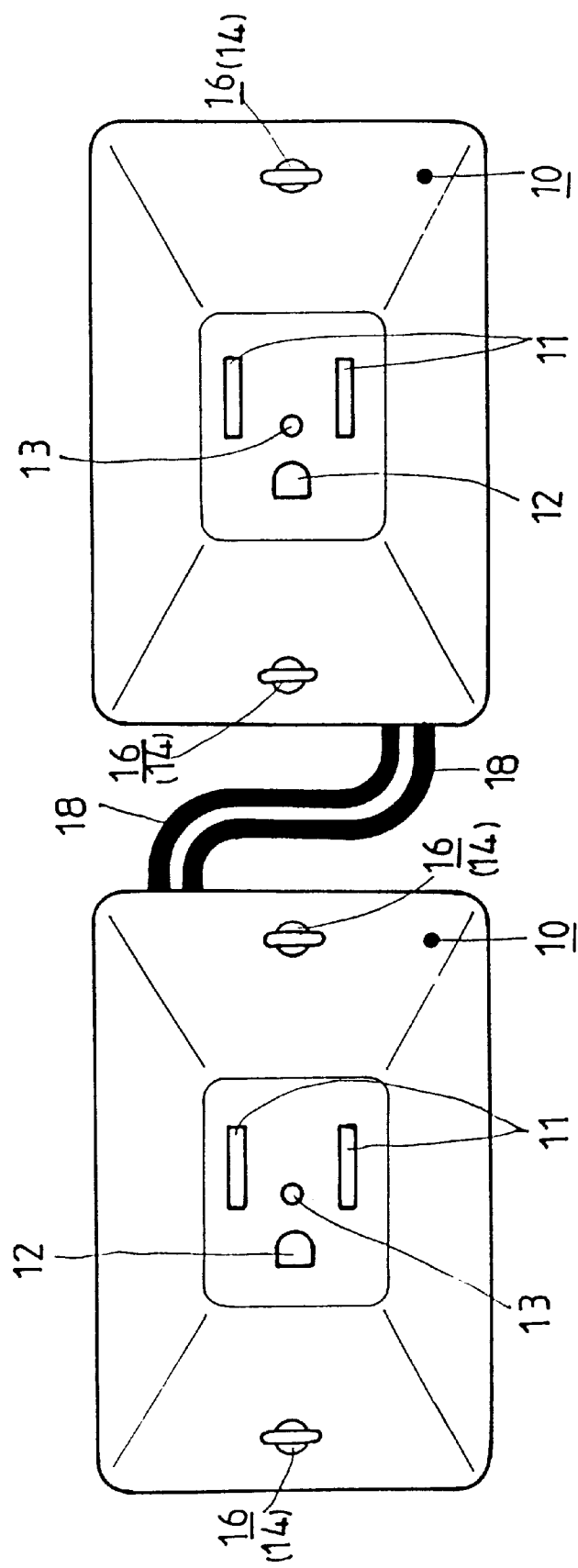
FIG. 12 illustrates how to connect two outlets according to the present invention in parallel.

Referring to FIGS. 2, 3, 4, 4A, 4B, 4C, 4D, 5, 5A, 5B, 6, 6A, 6B, 6C, 7, 7A, 7B, 7C, 8, 8A, 8B, 9, 10, 11 and 12, the present invention generally comprises a switch plate 1, a socket body 2, three wire self-locking devices 6, a fuse device (or circuit breaker) 9, a current indicator 10, two hooks 16 and a safety cover 17. The socket body 2 is constituted by conducting members 3 and 4 and a plastic protective cover 5. The conducting members 3 are used for power passage, while the conducting member 4 for grounding purpose. The wire self-locking device 6 is composed of bidirectional metal fixing members 7 and a plastic cap 8. The fuse device (or circuit breaker) 9 includes a fuse seat and electrical wire. The current indicator 10 includes a small light bulb. The hooks 16 are inserted in two threaded holes 14 of the switch plate 1. The safety cover 17 is mounted on the switch plate 1 for covering the slots 11 and 12. The slots 11 and 12 are formed on a raised portion of the switch plate 1. A fixing hole 13 is formed between the two slots 11 for receiving a pin 171 of the safety cover 17. The switch plate 1 has two holes 14 at two opposite sides thereof for the passage of two screws 141. The current indicator 10 is arranged at the bottom right corner of the switch plate 1 (with respect to FIG. 4). The socket body 2 is formed behind the raised with the slots 11 and 12 of the switch plate 1 and has three chambers. The upper and lower chambers of the socket body 2 are used for mounting two conducting members 3, in each of which are fitted two fixing bases 21 each with a sharp portion 211 at the top for keeping the conducting members 3 and the plastic protective cover 5 in place. The left fixing base 21 (with respect to FIG. 5) is formed formed with a groove 212 and a fixing hole 2121 for receiving and fixing an electrical wire 18. The intermediate chamber of the socket body 2 is used for receiving a grounding prong 4, in which are fitted two fixing bases 23 each with a sharp portion 231 at the top for keeping the grounding prong 4 and the plastic protective cover 5 in place. Similarly, the left fixing base 23 is formed with a groove 232 and a fixing hole 2321 for receiving and fixing a grounding wire 19. Between two fixing bases 21 there is a chamber 22 for receiving a clamp 31. Between two fixing bases 23 there is a chamber 24 for receiving a clamp 41. The clamps 31 and 41 are aligned with slots 11 and 12 for receiving a plug 20. The clamps 31 and 41 are respectively formed on bases 32 and 42 having holes 321 and 421 adapted to receive sharp portions 211 and 231 of the fixing bases 21 and 23. The bases 32 and 42 are respectively formed with elongated slot 322 and circular opening 422. As the plug 20 is inserted in the slots 11 and 12, the blades of the plug will first go through the clamps 31 and 41 and then the slots 322 and circular opening 422. The plastic protective cover 5 is used for protecting the conducting members 3 and 4 and has holes 51 and 53 aligned with the holes 321 and 421 of the conducting members 3 and 4 and the sharp portions 211 and 231 of the fixing bases 21 and 23. The plastic protective cover 5 has holes 52 and 54 in alignment with the slots 322 and circular opening 422 so that the blades of the plug 20 can go through the slots 11 and 12, clamps 31 and 41, slots 322 and circular opening 422, and holes 52 and 54 thereby reducing the height of the socket body 2. The wire self-locking device 6 includes two symmetric chambers provided with a plurality of sharp protuberances 61 at the top thereof and holes 62 for receiving wires. A bidirectional metal fixing member 7 is fitted within each of the chambers of the wire self-locking device 6. The bidirectional metal fixing member 7 has two resilient arms 71 and 72 for holding a power cord 18 and two shoulders 73 and 74 for withdrawing the power cord 18. The plastic cap 8 is mounted on the top of the chamber of the wire self-locking device 6 and has a plurality of blind holes 81 adapted to engage with corresponding sharp protuberances 61 of the wire self-locking device 6. Two symmetric copper members 82 with protuberances 821 are fitted on inner side of the plastic upper cover 8. The protuberances 821 are used for fixing the copper members 82 on the plastic cap 8. As the power cord 18 is inserted into the wire self-locking device 6 through the hole 62, the power cord 18 will be held by the resilient arms 71 and 72 and urged by the resilient arms 71 and 72 against the copper member 82. The intermediate portion of the inner side of the plastic upper cover 8 has two legs 83 for separating the two arms 71 and 72 on one hand and holding the bidirectional metal fixing member 7 in place. The plastic cap 8 is formed with two holes 84 through which a screwdriver may be inserted to press the shoulder 73 or 74 to release the power cord 18. The fuse device (or circuit breaker) 9 is arranged in the space 25 of the switch plate 1 above the socket body 2. The current indicator 10 is fitted in the switch plate 1, which will give light in normal operation, but will turn off when the fuse is broken in overloaded condition. The hooks 16 are used for receiving the electrical cord or the plug 20 so that the electrical cord or the plug 20 will not drop down on the floor thereby facilitating the operation of holding the plug 20 and inserting in the outlet of the present invention. The safety cover 17 is a rectangular member made of plastic and provided with a pin 171 at the intermediate portion adapted to fit into the hole 13 of the switch plate 1. When the outlet is not in use, the safety cover 17 may be rotated to cover the slots 11 and 12 thereby keeping the children from danger. Further, the safety cover 17 has an opening 172 so that the safety cover 17 may engage with the hook 16 when opened.

When in assembly, two wires 18 and 19 are first inserted through the fixing holes 2121 and 2321 into the grooves 212 and 232. Then, three conducting members 3 and 4 are arranged on the fixing bases 21 and 23 to press the wires 18 and 19. Thereafter, the plastic protective cover 5 is installed on the bottom of the socket body 2. Then, two bidirectional metal fixing members 7 are mounted within two chambers of the wire self-locking device. for receiving wires. A bidirectional metal fixing member 7 is fitted within each of the chambers of the wire self-locking device 6. Then, the plastic protective cover 5 is mounted on the bottom of the socket body 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:
1. An electrical outlet comprising:
a switch plate having an outer side formed with a raised portion and an inner side formed with a socket body, said socket body being provided with three conducting members and a plastic protective cover;
three wire self-locking devices including two bidirectional metal fixing members and a plastic cap;
a fuse device;
a current indicator mounted on said switch plate;
a safety cover pivotally installed on said raised portion and provided with two hooks;
whereby said outlet is safe in use and can be rapidly and easily assembled.

* * * * *